United States Patent [19]
Chen et al.

[11] Patent Number: 5,805,735
[45] Date of Patent: Sep. 8, 1998

[54] METHOD AND APPARATUS FOR COMPRESSION OF DIGITIZED IMAGE DATA USING VARIABLE COLOR FIDELITY

[75] Inventors: Kok S. Chen, Sunnyvale; Magnus L. Karlsson, Milpitas; Allen M. Chan, Sunnyvale; Hungviet H. Nguyen, Fremont; Marilyn Chen, Atheton, all of Calif.

[73] Assignee: Apple Computer, Inc., Cupertino, Calif.

[21] Appl. No.: 969,462

[22] Filed: Nov. 13, 1997

Related U.S. Application Data

[63] Continuation of Ser. No. 397,372, Mar. 2, 1995, abandoned.

[51] Int. Cl.[6] ...................................................... G06K 9/66
[52] U.S. Cl. .......................... 382/239; 382/166; 358/524
[58] Field of Search .................................... 382/166, 173, 382/176, 232, 237, 239; 358/462, 521, 524, 539; 348/397

[56] References Cited

U.S. PATENT DOCUMENTS

| | | | |
|---|---|---|---|
| 4,663,660 | 5/1987 | Fedele et al. | 348/397 |
| 4,668,995 | 5/1987 | Chen et al. | 358/462 |
| 5,003,299 | 3/1991 | Batson et al. | 340/703 |
| 5,046,119 | 9/1991 | Hoffert et al. | 358/524 |
| 5,068,644 | 11/1991 | Batson et al. | 340/701 |
| 5,144,688 | 9/1992 | Bovir et al. | 382/166 |
| 5,267,333 | 11/1993 | Aono et al. | 382/166 |
| 5,361,147 | 11/1994 | Katayama et al. | 358/539 |

FOREIGN PATENT DOCUMENTS

| | | |
|---|---|---|
| 0402016 | 12/1990 | European Pat. Off. . |
| 59219071 | 12/1984 | Japan . |
| 60-097777 | 5/1985 | Japan . |
| 3042969 | 2/1991 | Japan . |
| 9406098 | 3/1994 | WIPO . |

OTHER PUBLICATIONS

Data Compression Techniques and Applications, Thomas J. Lynch, Ph.D, Van Nostrand Reinhold Company, New York, 1985, Table of Contents, plus Chapter 5, Transform Coding, pp. 68–81.

Tilings and Patterns–An Introduction, Branko Grunbaum et al., W. H. Freeman & Company, New York, 1989, 3 pages, including Contents page.

Inside Macintosh™, vol. I, II, and III, Addison–Wesley Publishing Company, Inc., 1985, 3 pages, including a page labelled I–470 Toolbox Utility Routines.

Graphics File Formats, David C. Kay et al, Windcrest®/ McGraw–Hill, 1992, Table of Contents, plus Chapter 15, JPEG, pp. 141–148.

Graphics Gems II, James ARVO, San Diego Academic Press, Inc., 1991, pp. 77–79.

PostScript Language Reference Manual, Second Edition, Adobe Systems Incorporated, New York: Addison–Wesley Publishing Company, Inc., 1990, pp. 304–307.

Record of the Asilomar Conference on Signals, Systems and Computers. Pacific Grove, Oct. 30–Nov. 2, 1994. 28th in series. vol. 2.

*Primary Examiner*—Christopher S. Kelley
*Attorney, Agent, or Firm*—Burns, Doane, Swecker & Mathis, L.L.P.

[57] ABSTRACT

The present invention is directed to systems and methods for compressing image data without segregating the image data into scanned and non-scanned components, while at the same time, improving both the compression ratio and the perceptabilty of the decompressed image. Improved perceptibility is realized regardless of whether the image data includes scanned images, non-scanned images or any combination thereof. Further, improved perceptibility is realized regardless of whether the images are monochrome or color.

22 Claims, 10 Drawing Sheets

| S | C0 | C1 | 16 bit MASK |

| S | C0 | C1 | Mask Lookup Index |

| 15 | 14 | 13 | 12 | 11 | 10 | 9 | 8 | 7 | 6 | 5 | 4 | 3 | 2 | 1 | 0 |

| 15 | 14 | 11 | 10 |
|----|----|----|----|
| 13 | 12 | 9  | 8  |
| 7  | 6  | 3  | 2  |
| 5  | 4  | 1  | 0  |

| C | C | C | C | C | ... | C |
|---|---|---|---|---|---|---|
| M | M | M | M | M | ... | M |
| Y | Y | Y | Y | Y | ... | Y |
| K | K | K | K | K | ... | K |

FIG. 5

METHOD AND APPARATUS FOR COMPRESSION OF DIGITIZED IMAGE DATA USING VARIABLE COLOR FIDELITY

This application is a continuation of application Ser. No. 08/397,372, filed Mar. 2, 1995 now abandoned.

BACKGROUND OF THE INVENTION

1. Field of the Invention:

The present invention relates generally to compression and decompression of digitized image data used, for example, to represent text, graphics and scanned images. More particularly, the invention relates to compression and decompression of image data using variable color fidelity; that is, color fidelity which is varied to enhance color reproduction of some image portions relative to other image portions.

2. State of the Art:

Digitized images displayed on scanners, monitors and printers are typically quantized on a pixel-by-pixel basis and stored in memory as pixel maps, more commonly referred to as pixmaps. A pixmap is a two-dimensional array of picture elements mapped to locations of the digitized image.

To provide sufficient color range and fidelity, each pixel is typically stored in memory as a set of color coordinates which define the pixel's color location in a given color space. For example, a pixel is typically represented by its red, green and blue color component values, or by its cyan, magenta and yellow color component values. The fidelity of the color reproduction is a function of the accuracy with which each color component is represented.

Due to the increased volume of data required to represent color images, effort has been directed to compression of color data pixmaps. Because it is not practical or possible to provide a digital representation for all possible colors, the data used to represent each color component is necessarily compromised. Color fidelity is further compromised when the data used to represent the various colors of an image is compressed.

Early attempts at image compression relied upon techniques deemed suitable for non-scanned image data (such as text and synthetic graphics), assuming that they would work equally well for scanned images. One such technique was run-length coding, as described in "Inside Macintosh, Volumes I, II, III", Addison-Wesley, Reading, Ma., 1985, ISBN 0-201-17737-4. Run-length compression exploits the repetition of pixel values in long data "runs" by transmitting a single pixel value together with the length of the "run". Such techniques are relatively simple and effective for data used to represent text and line-art. However, run-length coding techniques have proven less suitable for scanned images (such as scanned photographs or video images) where numerous colors typically exist.

More advanced compression techniques are directed to maintaining color as close to full fidelity as possible. However, these techniques are theoretically "lossy" in that information content (such as edge acuity of text included in the image) is not maintained.

For example, "Data Compression—Techniques and Applications", Van Nostrand, Reinhold, New York, 1985, ISBN 0-534-03418, describes the use of transform-based compression techniques for image data. These techniques, such as the Hadamard Transform, the Fourier Transform and the Principal Component Transform (also known as the Karhunen-Loeve Transform), transform one- or two-dimensional data into a space having more desirable properties. One such property is an ability to easily distinguish which data points can be encoded with less precision, or even dropped, without noticeably degrading the image perceived by the unaided eye when an inverse transform is applied to the lossy representation.

The Hadamard Transform transforms an input space into one which is spanned by the Walsh-Rademacher functions. The Fourier Transform transforms the input space into one which is spanned by complex exponentials. The Principal Component Transform transforms the input space into one which is spanned by the eigenvectors associated with the input data. Although the Principal Component Transform is preferred, the amount of computation required to perform compression is practically prohibitive.

More recently, the Discrete Cosine Transform was developed to avoid the prohibitive computation of the Principal Component Transform. The basis functions of the Discrete Cosine Transform are cosines of various frequencies. For photographic images, this transform has been determined to yield results closer to that of the Principal Component Transform than any transform other than the Principal Component Transform itself. The Discrete Cosine Transform, in combination with entropy-preserving compression techniques, evolved into the industry standard (Joint Photographic Experts Group) JPEG compression, as described in "Graphics File Formats", Windcrest/McGraw-Hill, Blue Ridge Summit, Pa., 1992, ISBN 0-8306-3059-7.

With the exception of the Hadamard Transform and a few others, the basis functions of the transforms used for image compression tend to be smooth functions. This is the case with the complex exponentials of the Fourier Transform and the cosine functions of the Discrete Cosine Transform. Therefore, these transforms do not yield good compression ratios when sharp edges are to be represented without perceptible degradation. Although these transforms are suited to representing scanned images, they are far from ideal for representing text and synthetic graphics.

Known efforts for compressing image data have addressed this drawback of compression transforms by segregating the data of a pixmap into two components: (1) scanned image components and (2) all remaining components (such as text and synthetic graphics). Once segregated, the scanned image components are passed through compression techniques better suited for compressing scanned images (such as the JPEG industry standard compression techniques). The remaining components of the image data are separately passed to compression techniques better suited for objects that require good edge acuity (such as run length encoding).

However, this technique of segregating image data components suffers significant drawbacks. One such drawback is that the function of segregating presents problems. Objects included within the image data have to be tagged as scanned image data or as non-scanned image data before being placed into the pixmap. Otherwise, there is no way of determining the type of object to which a pixel belongs. Additional complexities result when overlapping areas of scanned images and non-scanned images are included within the image data.

Accordingly, it would be desirable to provide a technique for compressing image data without requiring the complexities associated with segregating the image data into its scanned and non-scanned components. In so doing, it would be desirable to further reduce any perceptible degradation of the decompressed image, regardless of whether the image data includes scanned images, non-scanned images or any combination thereof.

SUMMARY OF THE INVENTION

The present invention is therefore directed to systems and methods for compressing image data without segregating the image data into scanned and non-scanned components, while at the same time, improving both the compression ratio and the perceptibility of the decompressed image. Improved perceptibility is realized regardless of whether the image data includes scanned images, non-scanned images or any combination thereof. Further, improved perceptibility is realized regardless of whether the images are monochrome or color.

Exemplary embodiments relate to a method and apparatus for processing a frame of image data by: partitioning the frame of image data into partitioned blocks; compressing the image data within each of said partitioned blocks by representing data of a block which is determined to include color variations with less color fidelity than data of a block which is not determined to include color variations; and storing the compressed image data as a representation of the image.

Further, exemplary embodiments relate to a method and apparatus for processing a frame of image data by: partitioning the frame of image data into partitioned blocks; classifying each of said partitioned blocks based on whether each said partitioned block is color variant or color invariant; filtering the image data of each partitioned block which includes color variations by limiting the variations in color to a predetermined number; compressing the image data within each of said partitioned blocks; and storing the compressed image data as a representation of the image.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein:

FIG. 5 illustrates an exemplary format for storing color data in memory;

DETAILED DESCRIPTION OF THE PREFERRED EMBODIMENTS

1. System Overview

Figure 1:
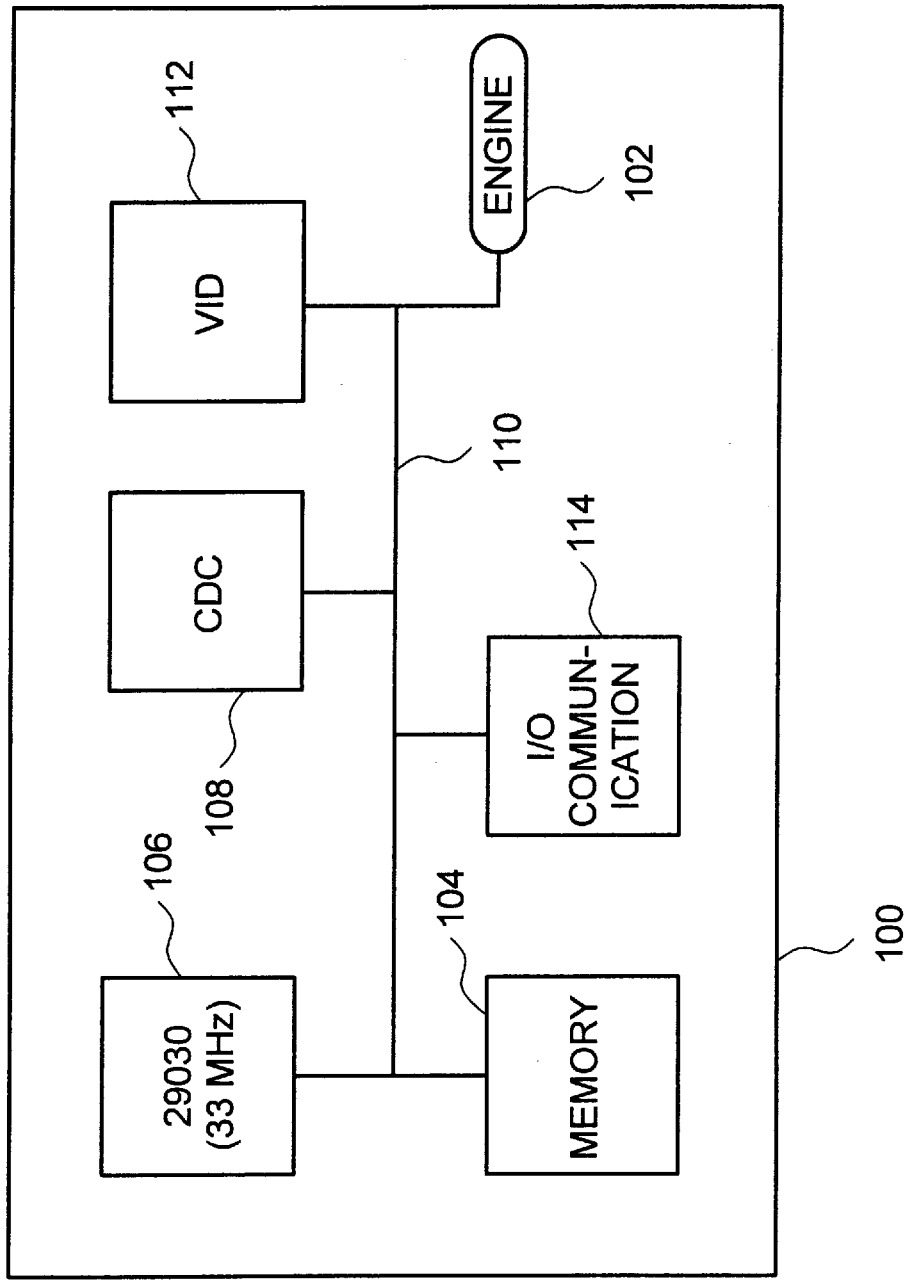
FIG. 1 illustrates a printing control system which incorporates an exemplary embodiment of the present invention.

FIG. 1 illustrates an exemplary embodiment of an apparatus for processing a frame of image data in accordance with an exemplary embodiment of the present invention. As referenced herein, image data corresponds to data obtained from an image that can be digitized for storage in a pixmap and subsequently compressed. Image data that is compressed in accordance with exemplary embodiments of the present invention can be digitized image data captured through any instrumentation, such as a video camera.

Image data as referenced herein encompasses scanned data as well as non-scanned data. Non-scanned data typically includes character glyphs and graphical data, such as hand-sketched or computer generated graphics. Those skilled in the art will appreciate that image data processed in accordance with exemplary embodiments of the present invention can also include any combination of scanned and non-scanned data.

As referenced herein, a frame of image data corresponds to a preselected group of digitized data, such as the data associated with a display screen or a printed sheet. Typically, such image data is obtained from or reproduced using a scanner device, a monitor or a printing device. However, those skilled in the art will appreciate that the image data can merely be processed for transfer between two locations (for example, between two computers).

It will be appreciated that exemplary embodiments of the present invention can be applied to the processing of image data for reproduction using any visual medium. In the case of printing, the image will typically be reproduced on conventional size paper such as letter size, A4, B5 and legal size. However, those skilled in the art will appreciate that the present invention can be applied to images of any size which are reproduced in any format. To facilitate an understanding of the present invention, FIG. 1 illustrates a printing system 100 which incorporates features of the present invention. The FIG. 1 printing system includes a color laser engine 102, such as any commercially available color laser marking engine. For purposes of the following discussion, the term "color" includes use of multiple colors (such as red, green and blue), as well as gray-scale printing using varying shades of gray.

Referring to FIG. 1, an incoming frame of data is directed by a processor, represented as printing system controller 106 having associated memory 104, to a compression/decompression coprocessor 108 (CDC). Because the memory required to store an entire frame of image data within the printing system 100 is impractical, an entire frame of uncompressed data is not stored within the printing system 100 at any given time. Rather, a frame buffer stores the incoming frame of image data in portions (for example, on a row-by-row basis), for sequential processing. As each portion of the frame is compressed, another portion is fetched by the printing system controller. As a result, the entire frame of image data is only stored in the print system 100 in compressed form.

In accordance with exemplary embodiments, the printing system controller 106 can be a reduced instruction set computer (RISC) such as the 33 Megahertz 29030 processor available from Advanced Micro Devices. The printing system controller 106 pre-processes an incoming frame of image data to: (a) scale the image data to a desired resolution; (b) partition the image data into partitioned blocks of a predetermined size; (c) resample the image data to ensure its alignment with the partitions; (d) filter the image data to ensure that each partitioned block contains no more than a predetermined number of color variations; and (e) create a side information buffer with information acquired during the pre-processing that can be used to enhance performance during subsequent processing.

In accordance with exemplary embodiments, the compressing of image data includes a step of classifying each partitioned block based on whether the partitioned block is determined to be color variant or determined to be color invariant. This step of classifying can be implemented by comparing the pixels within a given partitioned block to one another during the pre-processing to determine whether a given partitioned block is color variant or color invariant. Once having classified each partitioned block as being either color variant or color invariant, the compression/decompression co-processor 106 can be used to further compress the data. Those skilled in the art will appreciate that the steps of classifying each partitioned block as being either color variant or color invariant can be performed by the printing system controller 106 as part of the pre-processing (for example, classification information can be stored in the side information buffer), or can be performed by the compression/decompression coprocessor 108.

The compression/decompression coprocesssor 108 can, for example, be formed as a monolithic application specific integrated circuit (that is, an ASIC chip). However, those skilled in the art will appreciate that the processing implemented by the coprocessor 108 can be performed by the same processor used to implement the functions of the controller 106. The compression/decompression coprocessor compresses the image data included in the partitioned blocks of pixels to substantially reduce the memory requirements required to store a frame of image data.

In accordance with exemplary embodiments, the compression/decompression coprocessor compresses the image data within each partitioned block by representing a block which is determined to include color variations with less color fidelity than a block which is determined not to include color variations. Further, the compression/decompression coprocessor uses memory (that is, any specified memory) for storing the compressed image data as a representation of the original image. Alternately, the compressed image data can be immediately transmitted from the printing system 100 as it is compressed, for external buffering and decompression.

In an exemplary embodiment, a decompression engine is included within the compression/decompression coprocessor for use during the compression process. Recall that an entire frame of uncompressed image data is not stored in the printing system 100 at any given time; rather the entire frame is stored and compressed in sequentially processed portions. The decompression engine is provided within the compression/decompression coprocessor to accommodate a situation where newly received image data is to be superimposed on portions of the frame which have been earlier compressed. In this situation, the earlier compressed portion of the frame is retrieved, decompressed and returned to the frame buffer. The decompressed data which has been returned to the frame buffer is then overlaid with the newly received image data, after which the superimposed image data is recompressed.

Those skilled in the art will appreciate that the compression/decompression coprocessor need not be implemented using a separate chip; rather the compression/decompression functions can be implemented with any or all other functions of the FIG. 1 system in a single ASIC using a single processor. Further, those skilled in the art will appreciate that the compression and decompression functions of the FIG. 1 system can be implemented in software or hardware. In the exemplary FIG. 1 embodiment, the compression functions are implemented using software and hardware, while the decompression functions are primarily implemented in hardware.

Once a frame of image data has been compressed and stored in the compression/decompression coprocessor, it can subsequently be transferred to the printer engine 102 via a system bus 110 and a video interface device (VID) 112. The video interface device can, for example, be formed as a separate ASIC chip having a decompression processor to support decompression and half-toning. Alternately, a single processor can be used to implement the functions of the controller 106, the coprocessor 108 and video interface device 112. The video interface device provides high quality reproduction of the original image from its compressed format.

The FIG. 1 system further includes an input/output (I/O) communications device 112. The input/output communications device can include, for example, built-in networking support as well as parallel/serial I/O ports. Further, the I/O communications device can include additional memory as well as memory expansion ports. Any conventional I/O communications features can be used in accordance with the present invention, such that the I/O communications device need not be described in detail.

Before describing the compression/decompression operation in detail, the data format of uncompressed image data will be described. Afterward, pre-processing of the uncompressed image data will be discussed. Further, exemplary data formats compressed image data will be discussed.

2. Uncompressed Image Data Format

A frame of image data associated with an original image has a given width and length. The number of pixels in a given row of a scan line across the width of the frame is set in a horizontal total pixel count register. In accordance with exemplary embodiments of the present invention, the value set in the horizontal total pixel count register is divisible by 4.

In a vertical direction, along the length of the frame (and in the case of printing, along the paper motion direction), the number of pixels is set in a vertical total pixel count register. Again, the value set in the vertical total pixel count register of exemplary embodiments is divisible by 4.

In accordance with exemplary embodiments, the user can also set the number of bits used to represent each color component for a given pixel to 1, 4 or 8 bits. For example, if the user selects 4 color components to define a pixel, with each color component being represented by 8 bits, then each pixel would be represented as a 32-bit word (that is, 8 bits for each of the cyan, magenta, yellow and black color components).

In accordance with exemplary embodiments, the color of a pixel can be represented by any number of color components, including 1, 3 or 4 color components. For example, a four color component representation includes cyan, magenta, yellow and black color components. For a given application, when the number of color components used to represent a given color is set to 1, the color of a pixel is defined by the magnitude of a single color component (such as black). When the number of color components is set to three, the color components used can be cyan, magenta and yellow color components. When the number of color components is set to be four, the 4 color components mentioned above can be used to define the color of a given pixel.

Where each of four color components in each pixel of a pixmap is encoded with 8-bits, a letter-size page having approximately 32 million, 600 dots per inch (dpi) color pixels, requires approximately 128 Megabytes of memory to store the page. Because a memory requirement of 128 Megabytes per page is cost prohibitive, exemplary embodiments of the present invention are directed to compressing this data.

3. Pre-processing of Image Data

As mentioned previously, image data which is received for storage in the data frame buffer 214 is preprocessed to optimize the compression process. The preprocessing includes: (a) scaling a frame of digitized image data to ensure that each partitioned block will have the same number of pixels; (b) partitioning the frame into blocks having a predetermined number of pixels; (c) resampling the image data to account for misalignment between the frame of image data and partitioned blocks; (d) filtering to reduce the number of color variations within each partitioned block to a predetermined number; and (e) creating a side information buffer to enhance subsequent performance during compression.

a. Scaling

Scaling is implemented by the printing system controller 106 of FIG. 1 to ensure that an input image has a resolution which will match the selected size of partitioned blocks. For example, where a partitioned block is selected to include a 4-by-4 array of pixels, the incoming frame of image data is scaled to ensure that the number of pixels in each row and in each column is a multiple of 4.

The scaling can be implemented in any known fashion. For example, scaling can be implemented using pixel replication as described by Dale A. Schumacher in chapter 4 ("Fast Anamorphic Image Scaling") of the book entitled *Graphic Gems II*; Arvo, James; San Diego: Academic Press, Inc. 1991, the disclosure of which is hereby incorporated by reference. It may be that a frame of image data has been generated at a resolution of 72 dots per inch. Using pixel replication, the image data can be scaled up to 150 dots per inch for subsequent transfer to the compression/decompression coprocessor.

Those skilled in the art will appreciate that any scaling techniques can be used in accordance with exemplary embodiments of the present invention. Such scaling techniques can be used to either scale up or scale down an input frame of image data to any user selected resolution.

b. Partitioning

In accordance with the exemplary embodiment described herein, each frame of image data is partitioned into blocks formed as 4-by-4 pixel arrays. The exact block size can be set by the user as a block size field stored in a register.

Those skilled in the art will appreciate that the partitioned blocks can have any number of pixels, and that the blocks can be of any desired shape. It is only preferable that the blocks are capable of being tiled in non-overlapping fashion to encompass the entire image. For example, the shape of each partitioned area need not be square, but can be rectangular, cross-shaped, or shaped as described in "Tilings and Patterns, an Introduction", by W. H. Freeman, New York, 1989, ISBN 0-7167-1998-3, the disclosure of which is hereby incorporated by reference.

Those skilled in the art will appreciate that such partitioning is not limited to a single shape, but can be a combination of shapes. Further, those skilled in the art will appreciate that non-tiled and/or nonoverlapped blocks can be used at some possible expense to the compressed buffer size and/or the integrity of the compressed data relative to the original image.

c. Resampling

In accordance with exemplary embodiments, a frame of image data is repositioned when the center of a 4-by-4 pixel block does not align with the center of a partitioned block. For example, it is possible that an incoming frame of image data is already at the desired resolution, such that scaling of the data is not necessary. However, the image data may not be aligned with the preselected partitions of the memory where the uncompressed is stored (for example, the frame buffer).

For example, the image data may be such that the first partitioned block of pixels in the frame buffer is only half full of data (that is, either the first two rows or the first two columns of a 4-by-4 partitioned block contain no image data). In this case, the image data included within the pixel block is resampled such that the center of the resampled data is repositioned in alignment with the center of a partitioned block. This repositioning can be achieved by any conventional resampling technique. For example, resampling can be achieved using spatial filtering, nearest neighbor filtering, bi-linear interpolation, bi-cubic interpolation and so forth.

d. Color Variation Limiting

In accordance with exemplary embodiments, the compressing of image data includes the step of classifying each partitioned block as color variant or color invariant. In connection with this step of classifying, the image data is processed to ensure that no partitioned block includes greater than a predetermined number of color variations. Such processing can be achieved in any number of ways.

In an exemplary embodiment, each partitioned block is limited to at most two different colors. The two colors which are retained can be those deemed furthest from one another in a given color space. However, those skilled in the art will appreciate that each partitioned block can be limited to any number of colors (for example, 7 or more colors).

For example, where each partitioned block is limited to two colors and where a given block includes the colors red, blue and light blue, the light blue pixels can be converted to blue. Where more than two colors within a partitioned block are separated from one another in a given color space by more than a predetermined amount (e.g., a partitioned block includes the colors green, red and blue), color averaging of the pixels can be used to determine a single averaged color for all pixels within the partitioned block. Where color averaging is used, a previously multi-color partitioned block can be subsequently treated as a color invariant block (that is, a single color block) during the compression process.

In addition to the techniques mentioned above, an arbitrary selection of the colors which are to be retained can be used. For example, the first two colors detected in each partitioned block can be selected as the two colors to which all pixels in that block will be mapped.

In yet another embodiment, the color of the first pixel examined can be selected as the first color, and the color of each subsequent pixel can be compared against that of the first pixel. The color deemed furthest from the first color in a given color space can be selected as the second color, and each pixel in block can be mapped to one of these two colors.

The foregoing techniques for limiting the color variations of a partitioned block to a predetermined number are by way of illustration only. Those skilled in the art will appreciate that any number of such techniques can be devised.

e. Side Information Buffer

In an exemplary embodiment, the pre-processing can also include the creation of a side information buffer. The side information buffer can be used to store any characteristics of the pre-processed data which can be used to enhance the efficiency of subsequent compression or decompression processing.

For example, as the image data is pre-processed to limit the number of colors in each partitioned block to a predetermined number, the printing system controller 106 can store information which identifies each partitioned block as color variant, color invariant or clear (that is, totally white). Such information can be encoded for each partitioned block as a 2-bit value in the side information buffer.

During subsequent compression, the compression/decompression coprocessor can access the side information buffer as each partitioned block is accessed. For example, if the side information buffer indicates that a partitioned block is clear, the data is not read into the compression/decompression coprocessor. If the block is determined to be of the non-variant compressed data type, then only the top left pixel of the block is read to extract the color designated for the block. Only the top left corner pixel is examined, since all remaining pixels in the partitioned block are of the same color. If the partitioned block is identified by the side information buffer as being color variant, then all pixel data for that block is fetched in normal fashion.

Those skilled in the art will appreciate that a side information buffer as described can significantly enhance performance since, on the average, the majority of a page is white. However, the foregoing description of a side information buffer is by way of example only, and any information which will enhance subsequent processing can be included within this buffer.

4. Compressed Data Format

In accordance with exemplary embodiments of the present invention, a compressed data format (CD) is used whereby a single data word represents an entire partitioned block of pixels. For example, a single data word of up to 32 bits can be used to reconstruct what was previously described by the sixteen 32-bit words of a 4-by-4 pixel array, without creating noticeable color degradation of the decompressed image regardless of whether the image includes scanned images, non-scanned images or any combination of the two.

The location of compressed data in memory of the compression/decompression coprocessor is defined by a compression data pointer register. Because exemplary embodiments described herein are directed to the use of memory space having 32-bit word locations, words of up to 32 bits can be specified as a user-defined compressed data width field. In accordance with exemplary embodiments, a "compressed data word" is used to represent a compressed data block, and all such compressed data blocks are stored back-to-back in memory, regardless of the specified compressed data width, to maximize the use of memory.

In accordance with exemplary embodiments, two different word formats are used for compressed data: (1) a compressed data format for partitioned blocks determined to be color variant; and (2) a compressed data format for partitioned blocks determined to be color invariant. Color variant blocks are encoded with high edge acuity and reduced color fidelity, while color invariant blocks are encoded with high color fidelity. In exemplary embodiments, the most significant bit in both the color variant data block and the color invariant data block, referred to as the select (S) bit, identifies the compressed block as being either color variant or color invariant (that is, non-variant).

a. Color Invariant Compressed Data Block

Figure 2A:
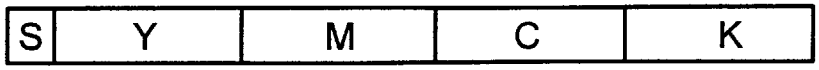
FIGS. 2a through 2d illustrate an exemplary format for encoding color invariant image data.
Figure 2B:
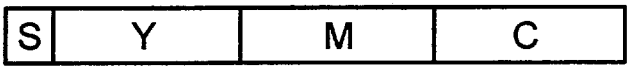
Figure 2C:
Figure 2D:
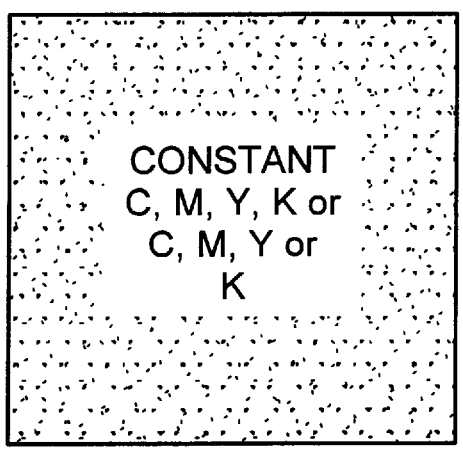

A non-variance compressed data block, as illustrated in FIG. 2a, is used to encode the pixels in a partitioned block where all pixels have the same color (see FIG. 2d). The user can specify the number of bits used to describe each color component of the single color associated with the color invariant block of pixels. Thus, the number of bits used to define each color component, in conjunction with the number of color components selected by the user to represent each pixel, will define the bits of a non-variance compressed data block.

In an exemplary embodiment, the number of bits used to describe the color of a color invariant block must be at least one bit less than the total number of bits available to describe each compressed data block of pixels (that is, 31 in the above example) to account for the select bit. In the exemplary embodiment described herein, the user can select any of three different sets of color components; that is, (1) cyan, magenta, yellow and black; (2) cyan, magenta and yellow; or (3) a single color component. Accordingly, three different types of non-variance compressed data blocks can be used, as illustrated in FIGS. 2a, 2b and 2c. In each case, a different number of bits can be used to represent the color components without exceeding the 31 bit limit of the exemplary embodiment.

For example, where black is the only color component used, up to 31 bits can be used to represent the black component of FIG. 2c. Of course, the FIG. 2c format can also be used where only the yellow, magenta or cyan color component has been selected to represent non-variant blocks. However, where all of the cyan, magenta, yellow and black color components are used, up to 7 bits can be used to represent each of these components via the FIG. 2a format; in this case the total word length, including the select bit, would be 29 bits.

b. Color Variant Compressed Data Block

Figures 3A, 3B, 3C, 3D, 3E:
FIGS. 3a–3e illustrate exemplary formats for encoding color variant image data.

A color variant compressed data block, used to represent partitioned blocks that include pixels of various colors, is illustrated in FIG. 3a. An alternate embodiment of a color variant compressed data block is illustrated in FIG. 3b. These data formats include: (1) a predetermined number of indexed color locations; and (2) a mask for mapping each pixel of the partitioned, color variant block to one of the indexed colors. Recall that in accordance with exemplary embodiments, each partitioned block is pre-processed to include at most two different colors; the two colors for a given data block are represented in the compressed data blocks of FIGS. 3a and 3b as 6-bit color indices for a first color (C0) and a second color (C1).

The 6-bit values for C0 and C1, included within the variance compressed data block serve as indices for searching a variance color look-up table. In an exemplary embodiment, the variance color look-up table stores a plurality of 32-bit color values in 64 locations, with a specific location being addressed by the values of C0 and C1. For example, the first entry in the variance color look-up table can correspond to white and the last entry can correspond to black. All data entries in between correspond to various colors ranging from white to black, (that is, colors having varying amounts of the cyan, magenta, yellow and black color components).

As illustrated in FIG. 3a, the color variant compressed data block includes: a single bit location for the select bit; a 6-bit location for the color C1; a 6-bit location for the color C1; and a 16-bit mask wherein each bit corresponds to one pixel of the 4-by-4 block.

The encoded values for C0 and C1 are obtained from a 512 entry C0/C1 encoding table that is addressed by a 9-bit value. The 9-bit value used to address the C0/C1 encoding table is, in an exemplary embodiment, obtained from the 32-bit color value of the pixel by first dropping the four least significant bits of the cyan, magenta and yellow color components, leaving 20 bits. A predetermined combination of 9-bits is then selected from among these 20-bits. The 9-bits selected can be varied (that is, programmed) as desired based on any user specified criteria.

The 9-bits which are selected can, for example, be the three most significant bits for black, and the two most significant remaining bits for each of the cyan, magenta and yellow color components. However, any combination of the bits can be used, such as the first, fourth and last bit of the black color component, and the first and fourth remaining bits of the cyan, magenta and yellow color components. In an exemplary embodiment, the 9-bits are selected via hardware, which functions as an interconnected matrix that can be altered by the user as desired (for example, on a page-by-page basis), or in response to any user selected criteria; however, software or any combination of hardware and software can be used to implement the selection process.

FIG. 3b illustrates the use of a compressed mask which serves as an index to a compression mask look-up table where a complete mask is stored. A compressed mask will be referenced herein as a mask index.

For partitioned blocks of 4-by-4 pixels having an uncompressed mask of 16 bits, compressed mask sizes of 8, 9 and 10 bits can be used in accordance with exemplary embodiments. However, those skilled in the art will appreciate that such mask sizes are by way of illustration only, and that any number of bits can be included in both the uncompressed mask and the compressed mask.

To accommodate use of either the FIG. 3a mask format or the FIG. 3b mask format, the compression mask look-up table, which is pointed to by a mask base register, is included in memory. During compression, the 16 bit mask obtained from a 4-by-4 partitioned block can be used to index the compression mask look-up table which, in an exemplary embodiment, is a 64 k entry table. In an exemplary implementation, each location in the mask look-up table stores two compressed masks, such that the table is actually configured in memory as a 32 k-entry-by-32 bit table (note that multiple non-compressed masks can be mapped to the same compressed mask, if desired). During decompression, the mask base register points to a 1 k decompression mask look-up table, which in an exemplary implementation, is actually configured as a 512 entry memory wherein each entry includes two decompressed masks.

FIG. 3c illustrates an exemplary embodiment of a 16 bit mask. The numbers shown in each of the FIG. 3c bit locations illustrate the manner by which the 16-bit mask maps to pixel locations of the 4-by-4 partitioned block illustrated in FIG. 3d. With the data format of FIG. 3a, the 16 bit mask is stored, in its entirety, within the compressed data block. However, with the data format of FIG. 3b, the 16 bit mask is stored in the compression mask look-up table pointed to by the mask base register and addressed by the mask index included in the compressed data block.

FIG. 3e illustrates an example wherein the binary values of a 16 bit mask in a color variant compressed data block map either the color C0 or the color C1 to each of the pixel locations of the 4-by-4 partitioned block. In accordance with an exemplary embodiment, a value of 0 at any given location of the 16-bit mask can be considered to correspond to the color C0, while a 1 at any of the 16-bit locations in the 16-bit mask can be considered to correspond to the color C1. Thus, a 16-bit mask having the binary values illustrated in the left hand side of FIG. 3e will map the colors C0 and C1 to the pixel locations shown in the right hand side of FIG. 3e.

The C0 and C1 values can, in an exemplary embodiment, also be stored as compressed values within the compressed data block of FIGS. 3a and 3b. In this case, an additional encoding table can be provided to expand the compressed C0 and C1 values to an address for the variance color look-up table.

4. Compression/Decompression Coprocessor (CDC)

a. CDC Configuration—Compression

Figure 4:
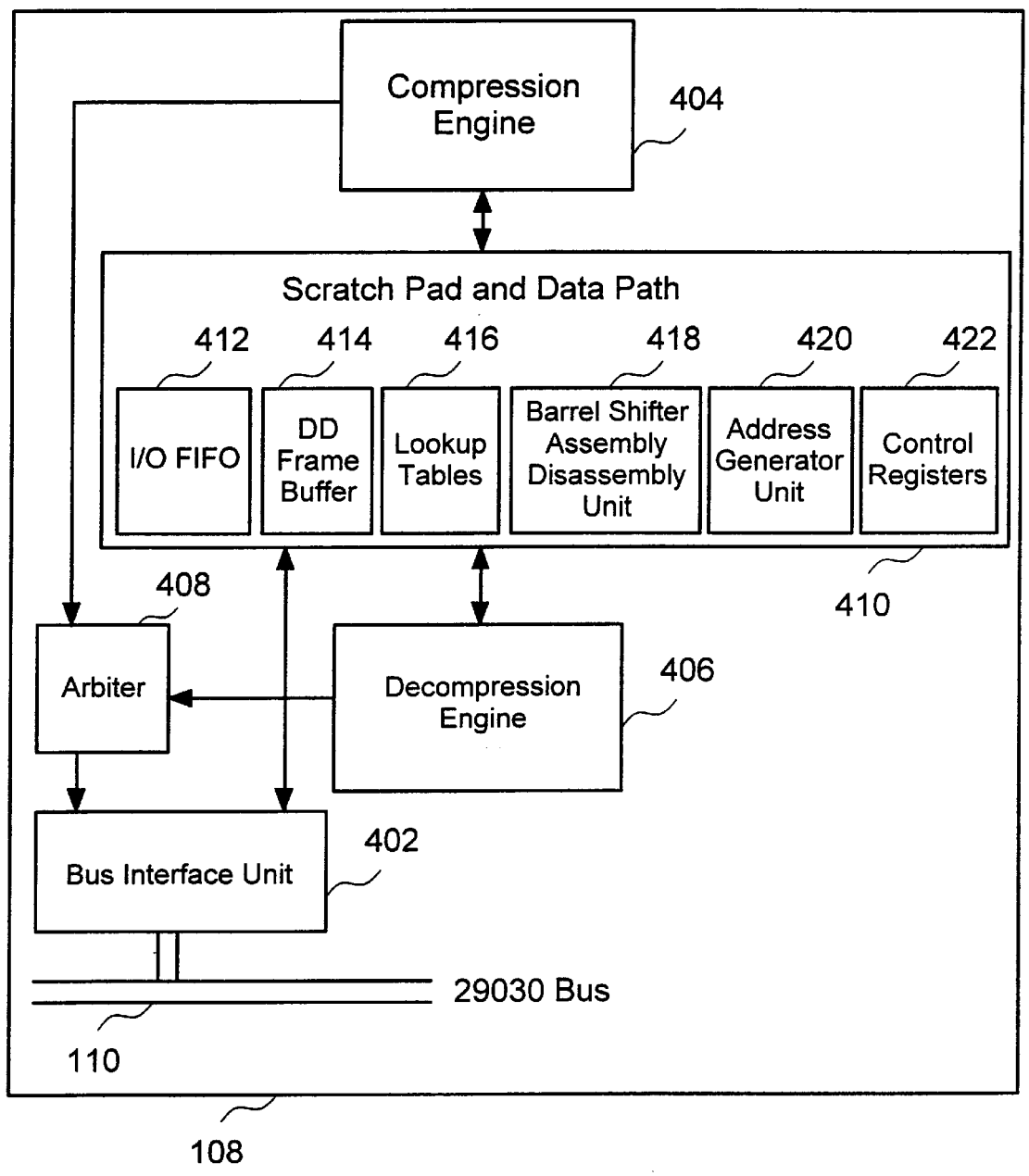
FIG. 4 illustrates an exemplary embodiment of a compression/decompression coprocessor in accordance with the present invention.

FIG. 4 illustrates a more detailed diagram of the exemplary compression/decompression coprocessor 108. The compression/decompression coprocessor 108 is interfaced to the system bus 110 via a bus interface unit 402. The compression/decompression coprocessor 108 includes a compression engine 404 and a decompression engine 406.

In an exemplary embodiment, the decompression engine 406 is used during the compression process. Recall that an entire frame of image data is not stored and processed at a single time, but rather is processed sequentially through the decompressed data frame buffer. The decompression engine of the compression/decompression coprocessor accommodates a situation where newly received image data is to be superimposed on portions of the frame which have been earlier compressed. In this situation, the earlier data is decompressed, and placed back into a frame buffer where it is overlaid with the incoming decompressed data. The later portion of the frame is therefore superimposed on the earlier processed data.

Access to the bus interface unit 402 by the compression engine 404 and the decompression 406 is controlled by an arbiter 408 which functions in any conventional manner. A scratch pad and data path block 410 is also provided and includes, among other features, resources such as registers and look-up tables used during operation of the compression/decompression coprocessor.

The scratch pad and data path block 410 includes an input/output first-in, first-out (I/O FIFO) buffer 41 2 for buffering information of the compression/decompression coprocessor. A decompression data frame buffer 414 (DD frame buffer) is also included, and is a double-buffered memory (as are most of the internal buffers). As one buffer of the DD frame buffer becomes full, the compression/decompression coprocessor can access data from that buffer while the bus interface unit 402 begins to fetch and load incoming image data to the other buffer.

The look-up tables 416 of the scratch pad and data path block 410 include the 64-entry variance color look-up table and the C0/C1 encoding look-up table. The variance color look-up table stores the limited range of colors used to describe partitioned blocks which are determined to be color variant (recall that a compression technique of the present invention encodes color variant blocks with reduced color fidelity). The C0/C1 encoding look-up table includes encoded values for C0 and C1. The compression and decompression mask look-up tables are also stored. As will be apparent to those skilled in the art, all of these tables can be included in a single memory, or can be stored in separate memories.

A barrel shifter assembly/disassembly unit 418 is also included in the scratch pad and data path block. In an exemplary embodiment the number of bits in a compressed data word can be less than the number of bit locations allocated to each word in memory. Recall that in an exemplary embodiment, 29 bits are used to represent a partitioned block in compressed form, while exemplary words in memory are 32 bits. However, the compressed data words are loaded one next to the other in memory (that is, all 32 bits of each word location in memory are used to store compressed image data). Therefore, to provide accurate read-out of compressed data, barrel shifting is used to shift a compressed data word in memory before each field of that word is extracted.

An address generator unit 420 is also included in the scratch pad and data path block. The address generator accesses locations of the various registers and look-up tables included within the compression/decompression coprocessor.

Figure 5:
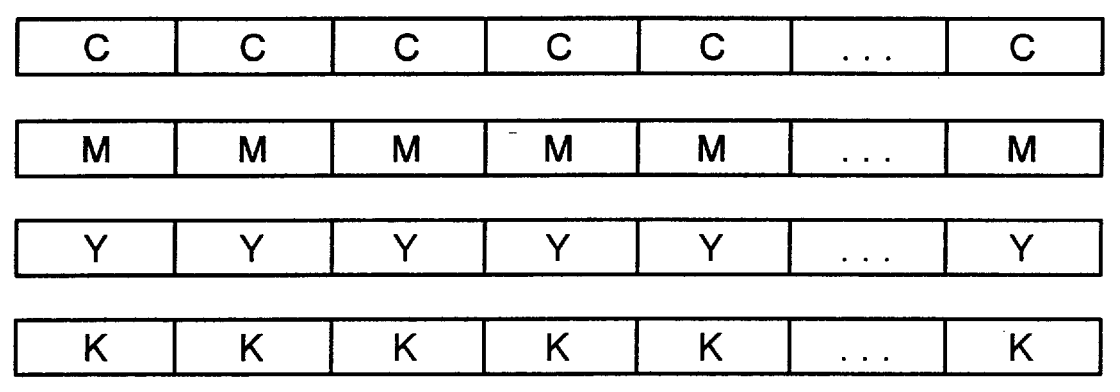

The control registers 422 include an identification (ID) register for storing system revision and identification information. A vector table pointer register is accessed to identify the locations in memory where compressed and decompressed image data is stored for a given row of partitioned blocks. In an exemplary embodiment, a separate plane in memory is used for each of the cyan, magenta, yellow and black color components, as illustrated in FIG. 5. Accordingly, the vector register table includes a cyan pointer register, a magenta pointer register, a yellow pointer register and a black pointer register. The vector register table also includes a side information pointer register and a compressed data pointer register. Each color component is represented by 7-bits which identify one of up to 128 values for each color component.

For color variant blocks, the mask base register and the C0/C1 encoding select register are accessed. These registers map the original 32-bit color in a color variant partitioned block of each pixel to colors included in the reduced color look-up table (that is, the exemplary 64 entry variance color look-up table).

The horizontal total pixel count register, and the vertical total pixel count register, which store values representing the total number of pixels in each row and in each column, respectively of an incoming frame of image data, are also included in the registers 422. A vertical offset register can also be included to store an address offset between vertically adjacent pixels in an image to accommodate use of a one-dimensional memory for storing a two-dimensional image. Other registers are included for interrupt, enable and acknowledgement, command, operation status, and test functions.

Figure 6:
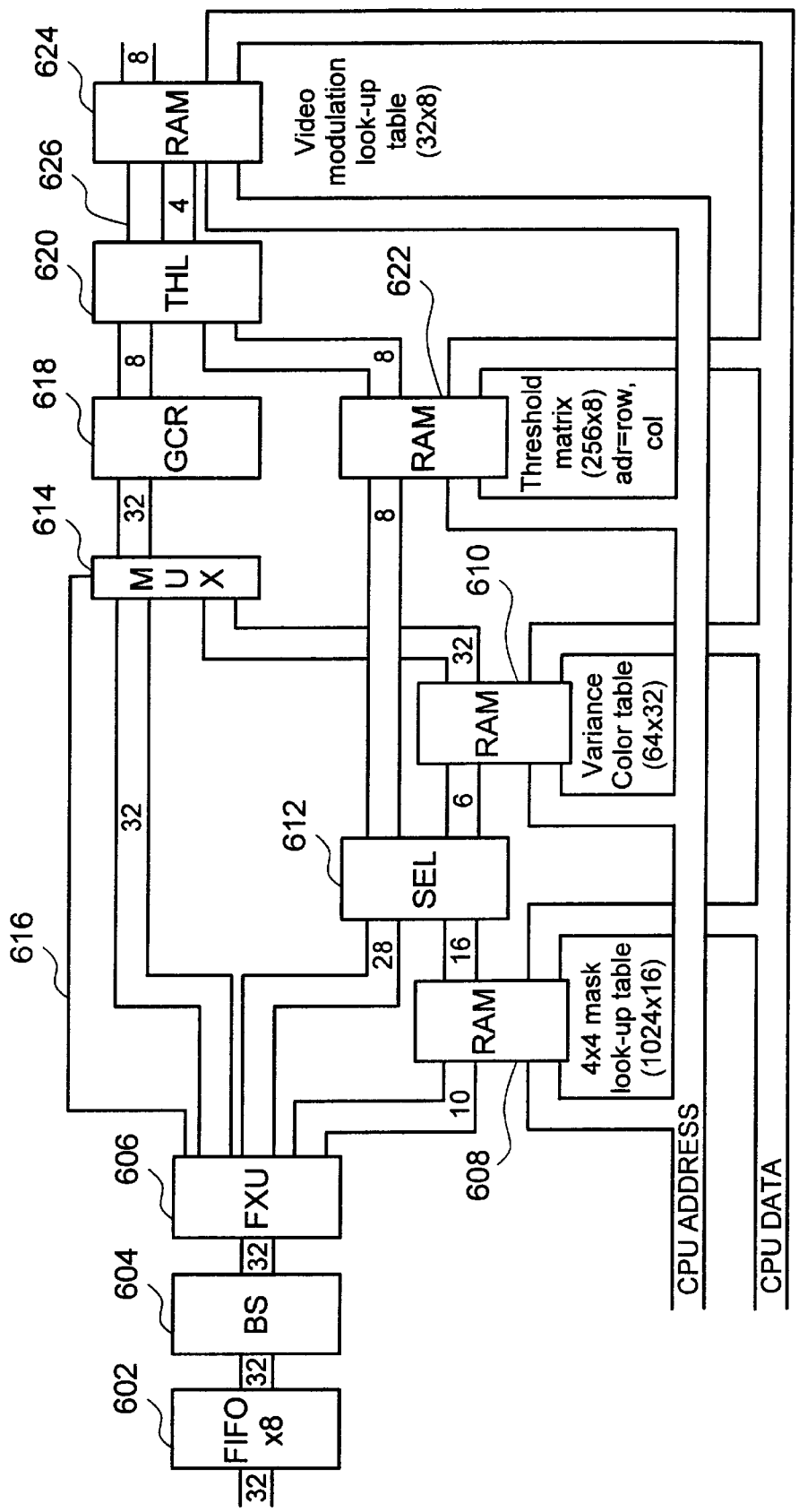
FIG. 6 illustrates an exemplary embodiment of hardware for decompressing data.

It is apparent from the foregoing discussion that in an exemplary embodiment, the compression operation is implemented using both hardware and software. However, to enhance the performance of the compression operation, the decompression functions of an exemplary embodiment are primarily implemented in hardware. The decompressor functions implemented in an exemplary compression/ decompression coprocessor are, for the most part, identical to those of the video interface device 112 (FIG. 1). FIG. 6, which illustrates exemplary hardware processing included within the video interface device, will therefore be used to describe the exemplary hardware decompression of the compression/decompression coprocessor.

b. CDC Configuration—Decompression

Referring to FIG. 6, decompression is initiated by fetching compressed data in the form of compressed data blocks from memory locations identified by a compressed data pointer register. The compressed data blocks are loaded into the compressed data input first-in first-out memory 602, non-variance data being loaded from locations identified by the vector table pointer register to accommodate the use of different color planes in memory. Because compressed data blocks can span word boundaries of memory, two compressed data blocks (that is, two data words) are loaded into a 64-bit register 604 and barrel shifted to the right by an amount indicated by the specified width of a compressed data word before each color field is extracted.

A field extraction unit 606 then extracts each color field of the compressed data word. If the compressed data block is of the non-variance type, then up to the four color components previously mentioned are extracted. If the compressed data block is of the variance type, then the mask is extracted along with the C0 and C1 values. Color fields which are less than 8-bits wide are replicated to an 8-bit width to provide, for four color printing, a 32-bit compressed data block.

For a variance block, mask look-up is performed if a mask compression mode had been selected. If mask look-up is required, the 1 k entry decompression mask look-up table 608 is searched using the compressed mask look-up index.

As a mask is being looked-up in memory, a color look-up for the colors C0 and C1 is performed using the variance color look-up table, if required. C0 and C1 are 0-extended to a full six bits before searching the variance color look-up table 610. The 6-bit input to the variance color look-up table 610 is selected by a selector 612, which in accordance with an exemplary embodiment corresponds to the multiplexers and row and column counters of FIG. 7.

Figure 7:
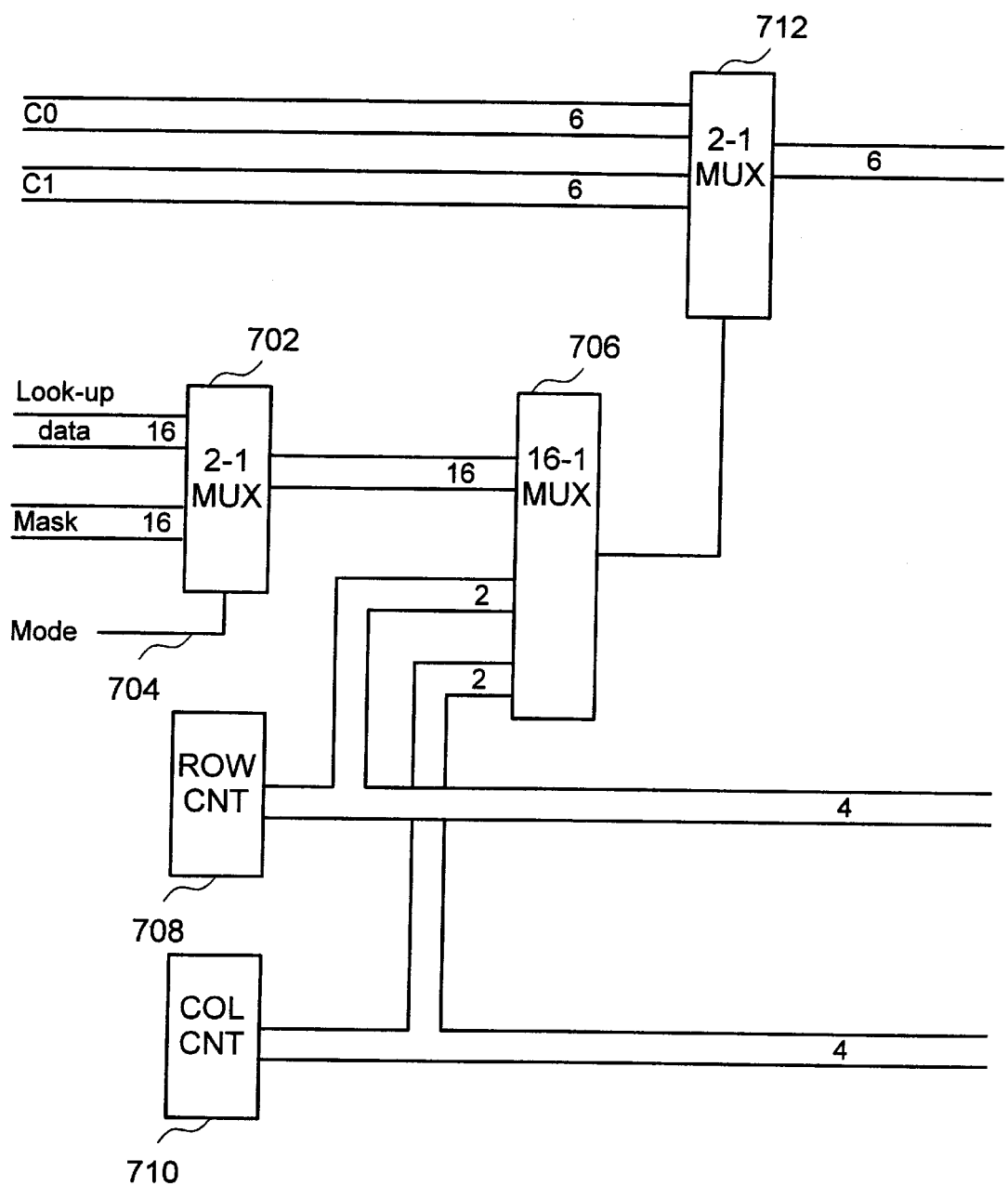
FIG. 7 illustrates an exemplary embodiment of a selector included within the FIG. 6 hardware.

Referring to FIG. 7, a 2-to-1 multiplexer 702 receives both a non-compressed 16-bit mask from the compressed data block, or a 16-bit output from the mask look-up table. A mode select input 704 to the multiplexer 702 identifies whether a compressed mask has been used so that the appropriate input to the multiplexer 702 can be selected and output to a 16-to-1 multiplexer 706. The output from the multiplexer 706 is selected by the bits from the row and column counters used to identify a given row and column in a partitioned block of pixels. The row and column counters are labelled counters 708 and 710 in FIG. 7, respectively. The output from the multiplexer 706 corresponds to a single pixel within a partitioned block of pixels, and identifies whether the color associated with the pixel is C0 or C1.

The output from the multiplexer 706 is used as a select input to a 2-to-1 multiplexer 712 for selecting either the 6-bit index for identifying the color C0 or the 6-bit index for identifying the color C1. The selected 6-bit output from the multiplexer 712 is used as a look-up address for the variance color look-up table 610 of FIG. 6, and thereby produces a 32-bit color output corresponding to the decompressed color C0 or C1.

The 32-bit output from the variance color look-up table is supplied to a multiplexer 614. The multiplexer 614 also receives a 32-bit input directly from the field extraction unit to accommodate decompressed data blocks of the non-variance type. A select line 616 to the multiplexer 614 corresponds to the select bit which identifies whether the partitioned block of pixels is of the variance type or the non-variance type. Depending on the binary state of this select bit, either the 32-bit data output directly from the field extraction unit 606 is selected or, in the case of a variance type block, a 32-bit output from the variance color look-up table 610 is selected. This process is repeated for each pixel of a partitioned block.

FIG. 6 also illustrates the supply of address and data information to each of the look-up table 608, the variance color table 610, the threshold matrix 622 and the video modulation look-up table 622. Such address and data lines are used to store data in these tables and to read data therefrom during testing, if desired.

c. CDC Operation

In operation, the compression/decompression coprocessor can, in accordance with exemplary embodiments, handle compression and decompression of an image on row-by-row basis. Because resources, such as on-board memory, are shared between compression and decompression engines 404 and 406 of FIG. 4, compression and decompression operations within the compression/decompression coprocessor do not run simultaneously. However, those skilled in that art will appreciate that by duplicating resources, these functions can be performed at the same time, if desired.

The compression or decompression process both use a vector table in memory which is pointed to by the vector table pointer register. The vector table pointer register includes a list of six 32-bit words or vectors per row of pixels. Each set of six vectors defines the first address in memory for each row of blocks, for both decompressed data and compressed data. These six words (for each row) are stored, respectively, in the cyan pointer register, the magenta pointer register, the yellow pointer register, the black pointer register, the side information pointer register and the compressed data pointer register.

The first five words identify the initial location of uncompressed or decompressed image data associated with a first pixel location. The five different words are used for uncompressed or decompressed data to accommodate the four different color planes of cyan, magenta, yellow and black used to represent each pixel, as illustrated in FIG. 5. Thus, when it is necessary to fetch uncompressed or decompressed data associated with a given pixel, a separate address identifying the location for each of the cyan, magenta, yellow and black components is provided. The sixth word is used to identify the start location of a first compressed data block associated with a compressed image.

Of course, those skilled in the art will appreciate that the use of a planar mode of data storage is not necessary, and that any number variations to the manner by which such image data is stored in memory can be implemented. For example, a single bit can be used to store each color component, with the color components of all pixels being interleaved in memory.

Depending on the mode of operation, the cyan, magenta, yellow and black pointer registers, and the compressed data pointer register will serve as either source or destination locations of the operation. After identifying the data which is to be processed, the compression/decompression coprocessor performs the compression or decompression of a single row of partitioned blocks. It then reloads the six registers with the next six locations of the vector table, and then compresses or decompresses the new row. The compression/decompression coprocessor, in accordance with exemplary embodiments, starts each new row at a 32-bit word boundary.

To initiate compression, all internal registers of the compression/decompression coprocessor are initialized. The compression/decompression coprocessor assumes that the system processor 106 has already pre-processed incoming image data, and that the 64 k-entry compression mask look-up table has been built-up.

After the vector table for a given row has been fetched from memory, the compression/decompression coprocessor begins fetching the side information first. The side information is examined before fetching decompressed data, and the variance bit of each partitioned block is extracted.

During compression, uncompressed data is transferred to the decompressed data frame buffer 414. For a block of pixels where no image present, the block can be considered a clear block wherein both colors are 0. Using the side information buffer, such a partitioned block can be encoded immediately as a white block having a color which corresponds to the first entry in the variance color look-up table. Similar processing can be provided for partitioned blocks determined to correspond to the last entry in the color variance look-up table (that is, black or any other saturated color). Adjustments are made during the compression process to reduce the number of burst read cycles upon the detection of non-variant color blocks to optimize performance.

In accordance with exemplary embodiments, uncompressed and decompressed data can be rearranged before it is loaded into the decompressed data frame buffer, to enhance the fetching of data from the decompressed data frame buffer by the compression engine. For example, this rearrangement of the uncompressed or decompressed data can be such that four consecutive reads will generate either one 4-by-4 block with 8 bits per color component, or eight 4-by-4 blocks with 1 bit per color component.

Once one of the two decompressed data frame buffers has been filled, the compression engine 404 reads the data and begins the process of building a 1 6-bit mask (that is, where each partitioned block is a 4-by-4 pixel block). During this time, the other buffer of the decompressed data frame buffer is being filled with image data for subsequent processing.

When building a mask, the compression/decompression coprocessor retains the top-left corner pixel of each block (that is, the reference pixel P15 of FIG. 3d), and also the pixel determined to be different from it (i.e., the second of the two colors) hereafter referred to as pixel Px.

Once the mask has been built for each block, the compression/decompression coprocessor uses the mask as an index to search the compression mask look-up table in memory referenced by the content of the mask base register if the mask size is programmed less than 16-bits wide. The mask look-up process is only initiated if the compressed data block is of the variance type (i.e., having two colors). However, there are two situations where fetching masks is unnecessary. Mask values of hex 0000 and hex FFFF yield values of all zeroes and all ones, respectively, such that these two mask entries correspond to the first and last locations of the mask look-up table.

The C0 and C1 values are obtained from the C0/C1 encoding look-up table. That is, a 9-bit value generated from the 32-bit color representation of a given pixel is used as an address to the C0/C1 encoding table to encode C0 (corresponding to the color of pixel P15). This process is repeated to encode C1 (corresponding to the color of pixel Px). In an exemplary embodiment, the C0/C1 encoding look-up table is a random access memory which outputs an 8-bit value, of which the six least significant bits are valid. Depending on the desired widths of C0 and C1, anywhere from 0 to all 6-bits can be used.

In accordance with exemplary embodiments, the C0/C1 encoding look-up table is built as a 128×32 look-up table. Thus, the compression/decompression coprocessor assembles four C0/C1 encodings before loading each entry of the random access memory.

At the same time a variance compressed data block of data is being built up, logic is also building up a non-variance compressed data block by extracting different bits out of each color component field from the reference pixel P15. Based on the variance polarity (that is, whether the partitioned block is of the variance or non-variance type), the appropriate compressed data block is then selected, assembled into a 29-bit data word and loaded into the first-in first-out buffer 412 (FIG. 4), before being written to memory locations identified by the compressed data register of the vector table.

When assembling compressed data, it is likely that compressed data blocks will span the 32-bit word boundaries. In an exemplary embodiment, when the compression engine 404 begins assembling compressed data of the new row of pixels, it will begin writing the new compressed data block at the beginning of a word boundary. The compression/decompression coprocessor then arbitrates for the system bus 110 and performs a burst write of compressed data to a compressed data band memory beginning with a location identified by the compressed data pointer register.

The compression or decompression process continues until the number of rows processed along the length of the image is equal to the vertical pixel count register value. At that time, the compression/decompression coprocessor can interrupt the processor. Alternatively, a polling process can be used to monitor the status of operation.

During the compression process, it is possible that incoming data must be superimposed on previously compressed data of a given frame, thereby invoking the decompression capabilities of the compression/decompression coprocessor. The decompression technique, like the compression technique, requires initialization of the various registers. The decompression process begins by fetching compressed data from memory beginning with the first value identified by the compressed data pointer register.

The compressed data blocks are loaded into the compressed data input/output first-in first-out buffer 412, wherein data may span across word boundaries. Accordingly, two compressed data blocks are loaded into a 64-bit register and barrel shifted to the right by an amount corresponding to the width of a compressed data block, before each field is extracted.

If the compressed data block is of the non-variance type, then up to four color components are extracted. The depth of each color field, together with the number of color components associated with each compressed data block specify the exact data extracted. For a non-variance block, each extracted field for each of the color components may be less than 8-bits wide. To distribute the error, all such field data is replicated to 8-bits before being used, in a manner as illustrated in Table 1.

| Field width | Extracted field data | Expanded field data |
|---|---|---|
| 1 | D0 | D0 D0 D0 D0 D0 D0 D0 D0 |
| 2 | D1 D0 | D1 D0 D1 D0 D1 D0 D1 D0 |
| 3 | D2 D1 D0 | D2 D1 D0 D2 D1 D0 D2 D1 |
| 4 | D3 D2 D1 D0 | D3 D2 D1 D0 D3 D2 D1 D0 |
| 5 | D4 D3 D2 D1 D0 | D4 D3 D2 D1 D0 D4 D3 D2 |
| 6 | D5 D4 D3 D2 D1 D0 | D5 D4 D3 D2 D1 D0 D5 D4 |
| 7 | D6 D5 D4 D3 D2 D1 D0 | D6 D5 D4 D3 D2 D1 D0 D6 |
| 8 | D7 D6 D5 D4 D3 D2 D1 D0 | D7 D6 D5 D4 D3 D2 D1 D0 |

If the compressed data block is of the variance type, then the mask, C0 and C1 values are extracted. Extraction is based on whether the compressed data includes a compressed mask index, the mask size and the depth of each of the C0 and C1 values.

Where the mask has been compressed, mask look-up may be required to expand the mask index. If mask look-up is required, the compression/decompression coprocessor will use the mask index to search the 1 k entry decompression mask look-up table which is pointed to by the mask base register in memory. The mask look-up index is 0-extended to 10 bits, in accordance with exemplary embodiments, before searching the decompression mask look-up table.

As a mask is being looked-up in memory, the decompression engine 406 performs color look-up for the C0 and C1 values, if required. The C0 and C1 values are 0-extended to the full 6-bits of the exemplary embodiment described herein before searching the variance color look-up table.

For each entry into the 64-entry variance color look-up table, a 32-bit decompressed color data output is generated. Again, because the exemplary embodiment described herein is directed to the use of four color components, each such color field in the 32-bit decompressed color data output is represented as an 8-bit value.

After building color data for variance and non-variance blocks, the compression/decompression coprocessor selects one or the other based on the select bit. Decompressed data is written to the four decompressed frame buffers, with one buffer being provided for each color component. Side information for each block is also written to the side information buffer.

The compression/decompression coprocessor then arbitrates for the system bus and writes the decompressed data and side information to memory. Target addresses for these color component buffers in memory are defined by the cyan pointer register, the magenta pointer register, the yellow pointer register, the black pointer register and the side information pointer register.

5. Video Interfacing Device

Figure 10:
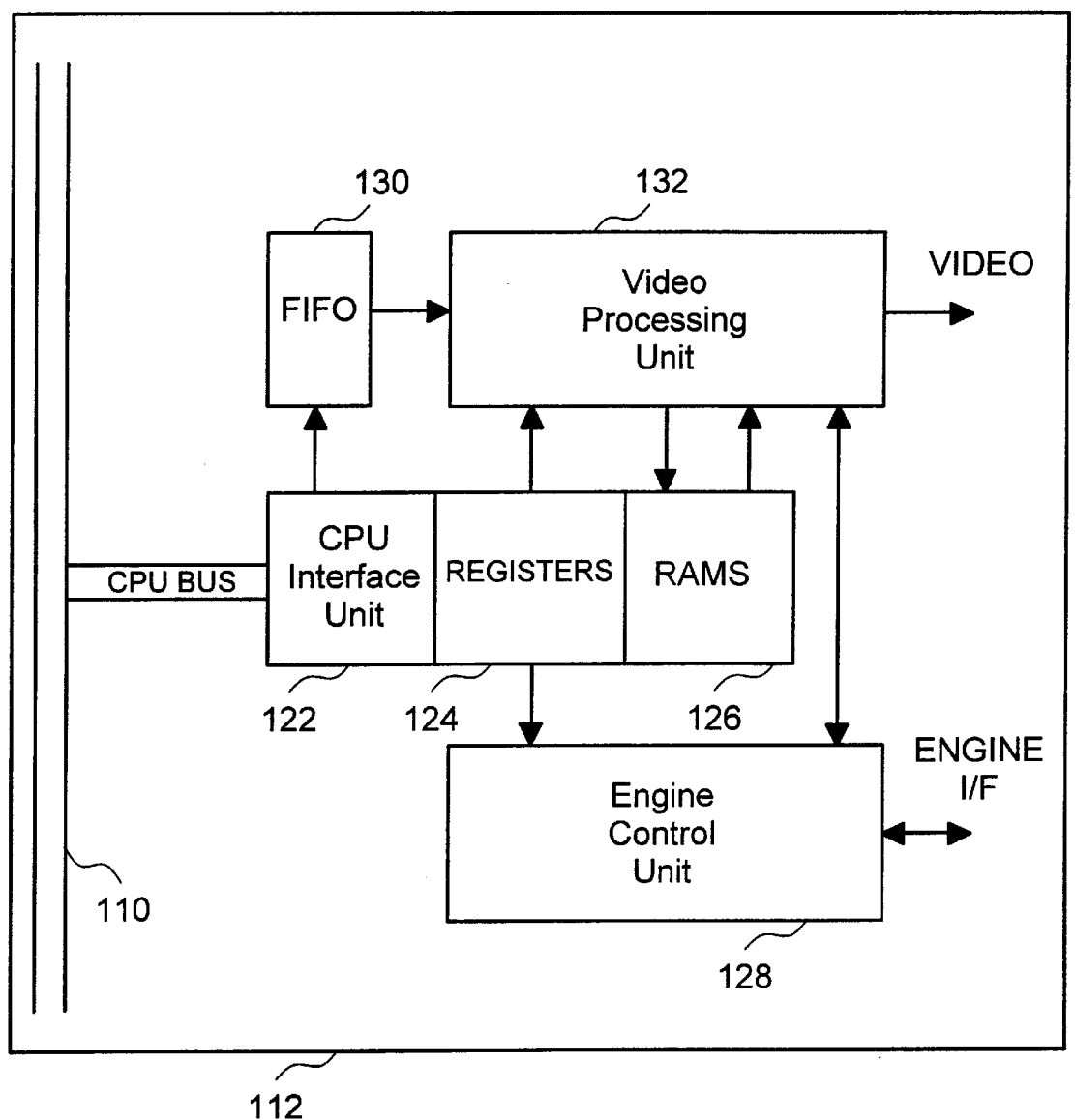
FIG. 10 illustrates an exemplary embodiment of the video interface device illustrated in FIG. 1.

FIG. 10 illustrates an exemplary embodiment of the video interface device used for decompressing data such that it can be output to, for example, a display or printer. Many of the features included in the FIG. 10 architecture duplicate features included within the decompression engine of the compression/decompression coprocessor 108. Accordingly, only those features of the video interface device which do not duplicate structure and function of the compression/decompression coprocessor will be discussed.

As illustrated in FIG. 10, the video interface device includes a CPU interface unit 122, registers 124 and RAM 124. An engine control unit 128 is provided along with a video processing unit 132 (that is, decompression processor) and first-in first-out buffer 130.

The CPU interface unit is provided for handling data transactions such as slave access and direct memory read access. Slave access is synchronous read or write access to a register or RAM location within the video interface device 112. Direct memory read access is used during the output of decompressed data to read in compressed image data from main memory.

Decompression within the video interface device is performed in a manner similar to that described previously with respect to the compression/decompression coprocessor. However, unlike the compression/decompression coprocessor wherein decompressed data is fed back to the frame buffer for combination with incoming decompressed data, the video interface device decompresses the data for output (for example, output to a print engine, communications bus or display).

Because the decompression of the video interface device as illustrated in FIGS. 6 and 7 has been described previously in connection with the compressor/decompressor coprocessor, only the gray component removal and halftoning features of the FIG. 6 hardware (which are not included in the compression/decompression coprocessor) will be described.

As illustrated in FIG. 6, the output from the multiplexer 614 is supplied to a gray component removal block 618. The output from the gray component removal block is an 8-bit output which is supplied to threshold logic 620 for halftoning. The threshold logic 620 also receives an 8-bit output from a threshold matrix 622.

Figure 8:
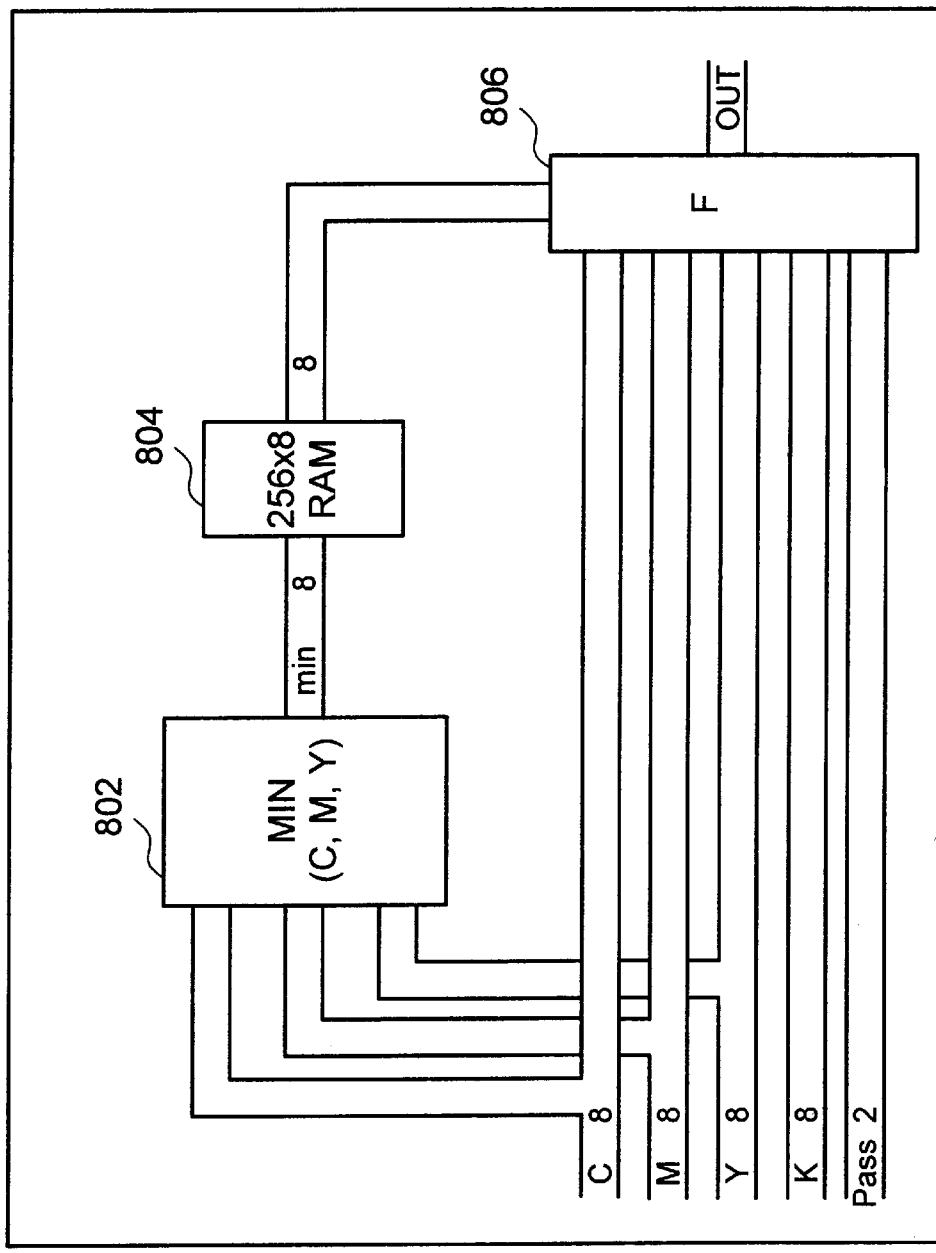
FIG. 8 illustrates an exemplary embodiment of the gray component removal device illustrated in FIG. 6.

Gray component removal can be used with cyan, magenta and yellow data to transfer some or all of the gray component from the cyan, magenta and yellow data of a pixel to the black plane, since the black toner is closer to ideal black than a combination of the cyan, magenta and yellow toner. FIG. 8 illustrates an exemplary embodiment of the gray component removal block 618. For flexibility, a look-up table 804 can be used to define the gray component based on the common part of the cyan, magenta and yellow toner, as determined in Min(C,Y,M) block 802. For example, if a given input color contains 30% cyan, 50% magenta and 70% yellow, 30% of each component would be defined as the common gray component. Rather than use the cyan, magenta and yellow toners to produce the black component, black toner can thus be used for the black portion of the pixel. The look-up table 804 provides a 0 percent through a 100 percent gray component removal as well as non-linear gray-component removal functions.

In alternate embodiments, the look-up table 802 can be loaded between print-passes with different table data for each component. An exemplary look-up table which is 256×8 in size will output an 8-bit value based on the 8-bit common part of the cyan, magenta and yellow for the pixel. The 8-bit output is subtracted from the cyan, magenta and yellow, and added to the black component by a filtering block 806 during printing.

The use of gray component removal is known, and has been described for example in "PostScript Language Reference Manual, Second Edition", Adobe Systems Incorporated, New York: Addison-Wesley Publishing Company, Inc., 1990, ISBN 0-201-18127-4, the disclosure of which is hereby incorporated by reference. Thus, the gray component removal block can be readily implemented by those skilled in the art.

Half-toning can be used to reproduce gray scale data on the print engine with bi-level or near bi-level characteristics. Half-toning is well-known in the art, and is implemented using a threshold matrix 622 and threshold logic 620 in the exemplary FIG. 6 embodiment.

For example, a half-tone cell with n bi-level elements can reproduce n+1 shades of gray at the expense of resolution. By using sub-pixel modulation, where each pixel is sliced into m parts, a total of (m*n)+1 shades of gray can be produced. The spacing of the halftone cells and the order in which individual pixels are turned on as the half-tone cell goes from white (all pixels off to black (all pixels on) defines the characteristics of the half-tone screen.

Thus, the data in the threshold matrix defines a spot function; that is, the order in which the pixels change from white to black as the half-tone cell varies from white to black. A value of zero in a pixel element of the threshold matrix defines the first pixel to turn black in a half-tone cell, a value of one defines the second pixel to turn black and so forth. The data in the threshold matrix can define one or more halftone cells as long as the half-tone cells are perfectly tiled within the threshold matrix. In accordance with an exemplary embodiment, a 45° screen using a 32 pixel half-tone cell can be produced by tiling two half-tone cells within an 8-by-8 threshold matrix.

In accordance with exemplary embodiments, screens can be created by tiling an area of 8-bit pixel values, defined as the threshold matrix or the threshold array over the entire printable area, such that each pixel in the printable area is mapped to a particular location in the threshold matrix. The top leftmost pixel in the printable area is mapped to the top left pixel element in the threshold matrix. The threshold matrix is stored in a threshold memory 622 which can, for example, be a 256 element memory. The vertical and horizontal dimension of the threshold matrix can be independently set from one to sixteen pixel elements for a maximum of 256 pixel elements.

The top left most area of the threshold memory is used as the threshold matrix. 4-bits output from a separate modulo-m row counter in counter 708 (FIG. 7) and 4-bits output from a separate modulo-n counter in the column counter 710 (FIG. 7) are used to address the threshold matrix 622. The values of m and n are, in an exemplary embodiment, each independently selected as a number between 1 and 16, m and n being determined by the desired height of the threshold matrix and desired width of the threshold matrix, respectively. An 8-bit output from the threshold matrix 622 is provided for each pixel in the threshold matrix to the threshold logic 620, along with the 8-bit output from the gray component removal block 618.

Figure 9:
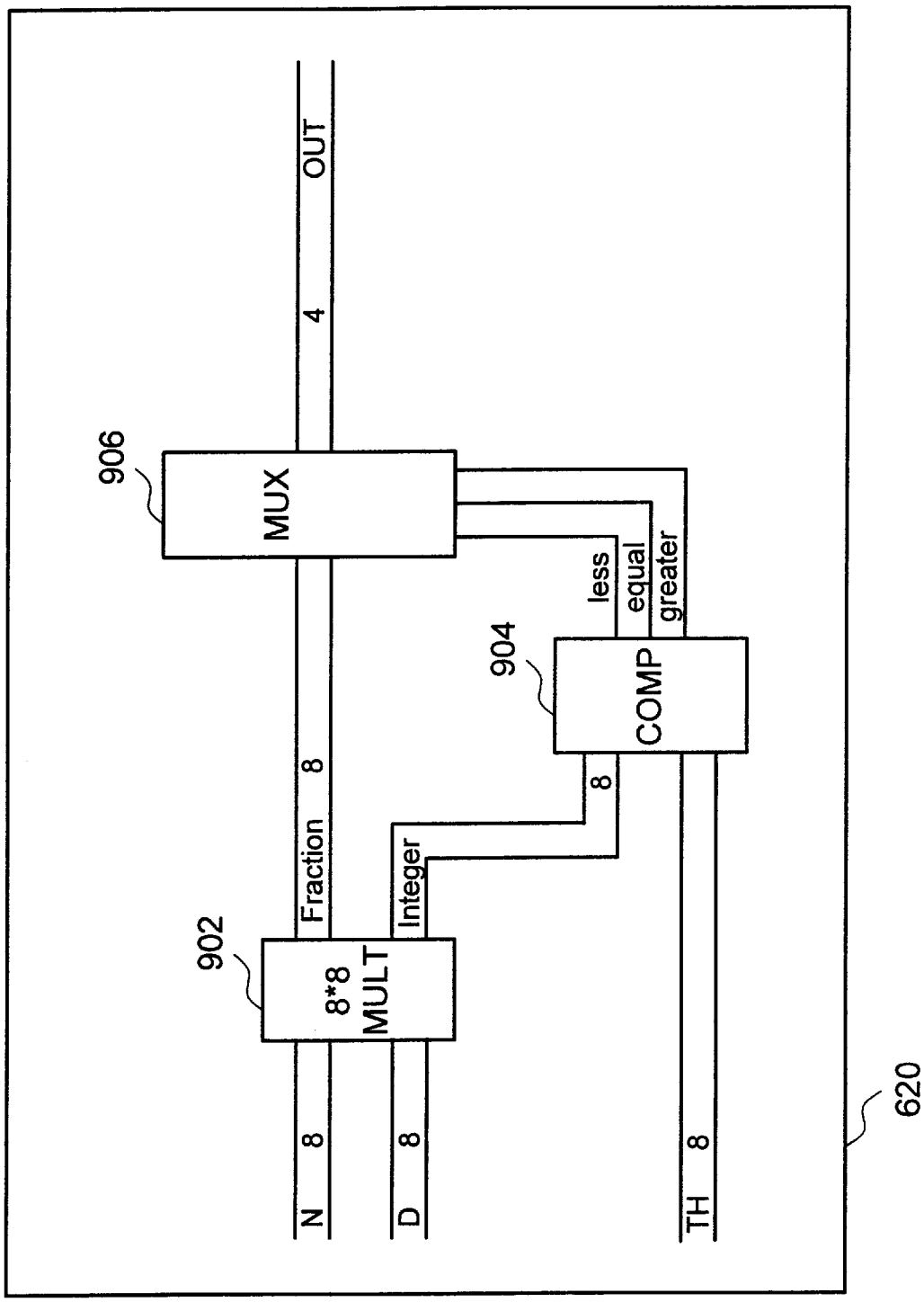
FIG. 9 illustrates an exemplary embodiment of the threshold logic illustrated in FIG. 6.

FIG. 9 illustrates an exemplary embodiment of the threshold logic 620. The 8-bit output from the threshold memory represents the number whose magnitude is proportional to the order in which a given pixel is turned on when the half-tone cell goes from white to black. For each pixel, this value is supplied to a comparator 904 in the threshold logic. Here, the 8-bit value is compared against an integer value received from an 8-bit-by-8-bit multiplier 902.

The multiplier 902 receives the 8-bit output, labelled "D", from the gray component removal block 802, and receives a set value "N" which defines the number of pixels in a half-tone cell. These two values are multiplied and the result is divided by, for example, 256.

The integer value of the result is compared with the output from the threshold memory in comparator 904. The result of this comparison controls a multiplexer 906. In an exemplary embodiment, the multiplexer selects the four most significant bits included in the fractional portion of the output from multiplier 902 when the integer value equals the threshold memory output. If the integer value is less than the threshold memory output, the four bit output is 0000. If the integer value exceeds the threshold memory output, the four bit value is 1111.

While the foregoing constitutes one exemplary manner of implementing half-toning, those skilled in the art will appreciate that any half-toning process can be used in accordance with exemplary embodiments of the present invention. In the exemplary embodiment described above, the output after half-toning is a 4-bit gray value per pixel which is converted to a data format for use by the color laser marking engine. Depending on the color laser marking engine, the data format can be a serial video for direct sub-pixel modulation of the laser diode, or 8-bit parallel video to a continuous tone interface. In both cases, the data sent to the color laser engine comes from a video lookup table using the 4-bit gray value as index.

In the FIG. 6 example, the four bit output for each pixel, after half-toning in the threshold logic 620, is supplied as an input to the video modulation look-up table 624. The video modulation look-up table outputs an 8-bit value for each color component on a pixel-by-pixel basis, in known fashion.

In accordance with an exemplary embodiment, the look-up table 624 has thirty-two entries, the first sixteen of which are used for isolated pixels that have no black neighbor to the left or right, and the second sixteen entries are used for pixels that have a black pixel either to the left or to the right (as identified by the most significant bit, labelled address line 626). This scheme is used because most print engines have different transfer characteristics for a single gray pixel and for a gray pixel connected to a black pixel. Because exemplary embodiments of the present invention include less than a full scan line buffer, this technique is only applied in the horizontal direction.

Exemplary embodiments of the present invention support three different video interface modes:

(1) parallel video data;
(2) serial video data; and
(3) external video and clock circuitry.

Parallel video data is used with print engines that except multiple bits per pixel (that is, continuous tone, or contone) data. Because the pixel data after half-toning can have at most sixteen levels of gray in accordance with the exemplary embodiment described above, the user maps the sixteen gray levels to a corresponding 8-bit value that best fits the engine characteristics using the video look-up table.

Serial video data is used with print engines that allow direct modulation of the laser diode. Here, the engine has a video input signal that directly controls whether the laser diode is on or off. The 8 bit video data from the video look-up table is supplied to the printing system engine.

The external video and clock circuitry mode is a catch-all mode which allows other video modulation circuitry to be used, such as pulse width modulation. In this mode, the user must generate a pixel clock which starts when the laser beam is detected at the left margin and which stops when all data for a scan line has been sent out.

6. Summary of Operation

In summary, exemplary embodiments of the present invention involve partitioning a frame of image data into partitioned blocks representing non-overlapping areas of the original image. Each partitioned block is classified as being either an invariant block or a variant block, and depending on this classification, the data included within the block is compressed and decompressed using different formats.

For invariant blocks, the entire block of pixel values is encoded as a single representative color value. However, for variant blocks, each pixel is separately encoded, but with a reduced color fidelity that can be either implicitly deduced (for example, by maintaining a most significant 2-bits of each component of a color value) or explicitly set forth (for example by using a table corresponding to a palette of colors).

Decompression is performed by applying the reverse of the compression technique, first distinguishing whether a given block is variant or invariant. During decompression, there is no need to identify whether the information included within a given pixel block originally corresponded to a scanned image, a graphics image, or textual information. On the contrary, exemplary embodiments of the present invention maintain highly accurate color fidelity for scanned images and the interior of computer generated objects such as text or graphics which have constant color. Edges of objects, text and line art have their color fidelity sacrificed, in favor of maintaining maximum edge acuity on the premise that the perception to the eye will be less sensitive to color fidelity at edges of objects.

Exemplary embodiments of the present invention are directed to using a base resolution of 600 dots per inch, with each pixel including four color components of cyan, magenta, yellow and black. Each such color component, in exemplary embodiments, is one of 256 values. An entire pixmap, in accordance with exemplary embodiments is partitioned into non-overlapping blocks having a 4-by-4 pixel configuration. Thus, each partitioned block has a resolution of 150 dots per inch.

A compressed data block, for both variant and invariant blocks, is a 29-bit value. For invariant blocks, one bit is used to indicate that the block is invariant, and four 7-bit values are used to represent each of the cyan, magenta, yellow and black color components. For variant blocks, the number of colors within each block are pre-processed to two distinct colors, with every pixel included in the partitioned block being mapped to one of these two colors. A single bit for each of the sixteen pixels within the block is provided as a mask, to identify whether each such pixel corresponds to the first or second of the two colors. Each bit in the mask identifies which of the two colors is to be selected for that pixel from a reduced color palette of, for example sixty-four colors.

While the foregoing has set forth exemplary embodiments of the present invention, those skilled in the art will appreciate that these examples are by way of illustration only. For example, while exemplary embodiments have been described in connection with data compression with respect to pixmaps used in connection with printing, those skilled in the art will appreciate that techniques of the present invention are also suitable for the reduction of information transmitted between computers, or between a computer and an input device such as a scanner, or between a computer and an output device (such as a printer).

Further, those skilled in the art will appreciate that the partitioned blocks described above can be of any dimension. Further, the partitioning can be adaptive and dynamic, even within a given frame of image data, with the only requirement being that dimensional information be made known to the decompression process.

Exact dimensions of compressed and decompressed data blocks can also be modified as desired by the user, and the 29-bit value for compressed data blocks is by way of example only. Further, the compressed data and decompressed data block size need not remain fixed, but could be varied from block-to-block. Encoded variant and invariant block sizes can also be different from one another.

In addition, those skilled in the art will appreciate that a fixed color palette need not be used. Rather, the color palette can be dynamically assigned as long as the update information is part of the compressed data storage or stream.

Although variant blocks as described in the exemplary embodiment above are encoded as a 1-bit mask with two sub-palettes of a larger color palette, those skilled in the art will appreciate that masks of any size can be used. For example, a mask of 3-bits for each pixel can be used, with each 3-bits pointing to a palette or sub-palette of eight color values.

Those skilled in the art will further appreciate that invariant blocks need not correspond to blocks where all pixels have the same value. Rather, blocks with pixels that fall within an acceptable range can be mapped into an invariant color block, using a value that represents the entire block, with no visible degradation.

In accordance with alternate embodiments, those skilled in the art will appreciate that the variant and non-variant select indicator bit for each block need not be specifically encoded. For example, if a large area of the pixmap is non-variant, then the selector bit can be further compressed. For example, the selector bit can be encoded in run length fashion.

Further, known compression techniques can be used in conjunction with the compression techniques of the present invention. For example, two successive non-variant blocks can be encoded using a repeat flag, without having to encode the full information for the second and successive blocks. Further, where successive non-variant blocks differ only slightly from a preceding non-variant block, the known compression technique of delta modulation can be used to further compress the data. This use of such known compression techniques in accordance with the present invention is by way of illustration only, and any number of known compression techniques can be used in accordance with the present invention to improve compression.

Further, while compression has been described with respect to all components of a given pixel at one time, those skilled in the art will appreciate that the color components can be compressed separately.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for processing a frame of image data, comprising the steps of:
    partitioning the frame of image data into partitioned blocks;
    compressing the image data within each of said partitioned blocks by representing data of a block which is determined to include color variations with fewer bits per color for each color than data of a block which is determined not to include color variations; and
    storing the compressed image data as a representation of the image.

2. A method according to claim 1, wherein said step of partitioning further includes a step of:
    scaling the image data to a resolution which corresponds to said partitioning.

3. A method according to claim 2, wherein said step of partitioning further includes a step of:
    resampling said image data when a boundary of said image data does not align with a partition.

4. A method according to claim 1, wherein said step of compressing further includes a step of:
    classifying each of said partitioned blocks based on whether each said partitioned block is color variant or color invariant.

5. A method according to claim 4, wherein each partitioned block includes a predetermined number of pixels, and wherein said step of classifying further includes a step of:
    comparing the pixels within a given partitioned block to one another to determine whether said given partitioned block is color variant or color invariant.

6. A method according to claim 1, wherein said step of compressing further includes a step of:
    filtering the image data of each partitioned block which includes variations in color by limiting the variations in color to a predetermined number.

7. A method according to claim 1, wherein each of said partitioned blocks corresponds to non-overlapping areas of said frame of image data.

8. A method according to claim 1, wherein said step of compressing further includes steps of:
    encoding partitioned blocks determined to include variations in color with a first compressed data format; and
    encoding partitioned blocks determined not to include variations in color with a second compressed data format.

9. A method according to claim 1, further comprising a step of:
    decompressing the compressed image to reproduce said image.

10. A method for processing a frame of image data, comprising the steps of:
    partitioning the frame of image data into partitioned blocks;
    classifying each of said partitioned blocks based on whether each said partitioned block is color variant or color invariant;
    filtering the image data of each partitioned block which includes color variations by limiting the variations in color to a predetermined number;
    compressing the image data within each of said partitioned blocks such that color data for a block which is determined to include color variations is encoded with fewer bits per color for each color than color data of a block which is determined not to include color variations; and
    storing the compressed image data as a representation of the image.

11. A method according to claim 10, wherein said step of compressing further includes a step of:
    compressing the image data within each of said partitioned blocks by representing data of a block which is determined to include color variations with less color fidelity than data of a block which is determined not to include color variations.

12. A method according to claim 11, wherein said step of partitioning further includes a step of:
    scaling the image data to a resolution which corresponds to said partitioning.

13. A method according to claim 12, wherein said step of partitioning further includes a step of:
    resampling said image data when a boundary of said image data does not align with a partition.

14. A method according to claim 13, wherein each partitioned block includes a predetermined number of pixels, and wherein said step of classifying further includes a step of:
    comparing the pixels within a given partitioned block to one another to determine whether said given partitioned block is color variant or color invariant.

15. A method according to claim 14, wherein said step of compressing further includes steps of:
    encoding partitioned blocks determined to include variations in color with a first compressed data format; and
    encoding partitioned blocks determined not to include variations in color with a second compressed data format.

16. A method according to claim 10, wherein each of said partitioned blocks corresponds to non-overlapping areas of said frame of image data.

17. A method according to claim 10, wherein further comprising a step of:
    decompressing the compressed image to reproduce said image.

18. A method according to claim 10, wherein each partitioned block is a 4-by-4 pixel array.

19. Apparatus for processing a frame of image data, comprising:
    a processor for partitioning a frame of image data into partitioned blocks, and for filtering the image data to limit color variations within each partitioned block to a predetermined number;
    a frame buffer for storing the partitioned blocks of image data;
    a coprocessor for compressing the image data within each of said partitioned blocks by representing data of a block which is determined to include color variations with fewer bits per color for each color than data of a block which is determined not to include color variations; and a memory for storing the image data compressed by said coprocessor as a representation of the image.

20. Apparatus according to claim 19, wherein said coprocessor decompresses at least a portion of the image data stored in said memory, stores said decompressed image data in said frame buffer, and superimposes additional image data on said decompressed image data in said frame buffer.

21. Apparatus according to claim 20, further comprising:

a decompression processor for decompressing the image data stored in said memory to reproduce said image.

22. Apparatus according to claim 19, wherein said processor and said coprocessor are formed as a single processor.

* * * * *